United States Patent [19]
Appleton

[11] 3,876,284
[45] Apr. 8, 1975

[54] LIGHT REFLECTOR FOR WINDSHIELD WIPER ASSEMBLY

[76] Inventor: Dale A. Appleton, 3200 West 53rd St., Gary, Ind. 46408

[22] Filed: Aug. 27, 1973

[21] Appl. No.: 392,036

[52] U.S. Cl. .............................. 350/99; 350/288
[51] Int. Cl. .................................. G02b 5/12
[58] Field of Search ............... 350/61, 63, 97–109, 350/288

[56] References Cited
UNITED STATES PATENTS

| 2,361,319 | 10/1944 | Paul | 350/107 |
| 2,535,805 | 12/1950 | McIntyre | 350/61 |
| 2,575,418 | 11/1951 | Jackson | 350/97 |
| 2,781,017 | 2/1957 | Fuller et al. | 350/97 |
| 2,928,201 | 3/1960 | Shanok | 350/97 |
| 3,687,794 | 8/1972 | Shanok | 350/97 |
| 3,791,336 | 2/1974 | Zdebski | 350/97 |

FOREIGN PATENTS OR APPLICATIONS

| 847,169 | 9/1960 | United Kingdom | 350/108 |
| 530,001 | 7/1954 | Belgium | 350/107 |

OTHER PUBLICATIONS
In Re Mason, No. 7205, 51 CCPA–; 331 F2d 608; 141 U.S.P.Q. 521; 807, O.G.–2 pp. 9–12.

*Primary Examiner*—Vincent P. McGraw
*Assistant Examiner*—Michael J. Tokar
*Attorney, Agent, or Firm*—Marden S. Gordon

[57] ABSTRACT

A light reflecting warning attachment intended for mounting on a vehicle windshield wiper assembly and provided with a light reflecting surface intended to be visible forwardly of the vehicle to oncoming traffic, with such visibility being increased during inclement weather during usage of the windshield wiper assembly in the conventional manner to maintain the windshield clear for visibility purposes.

1 Claim, 7 Drawing Figures

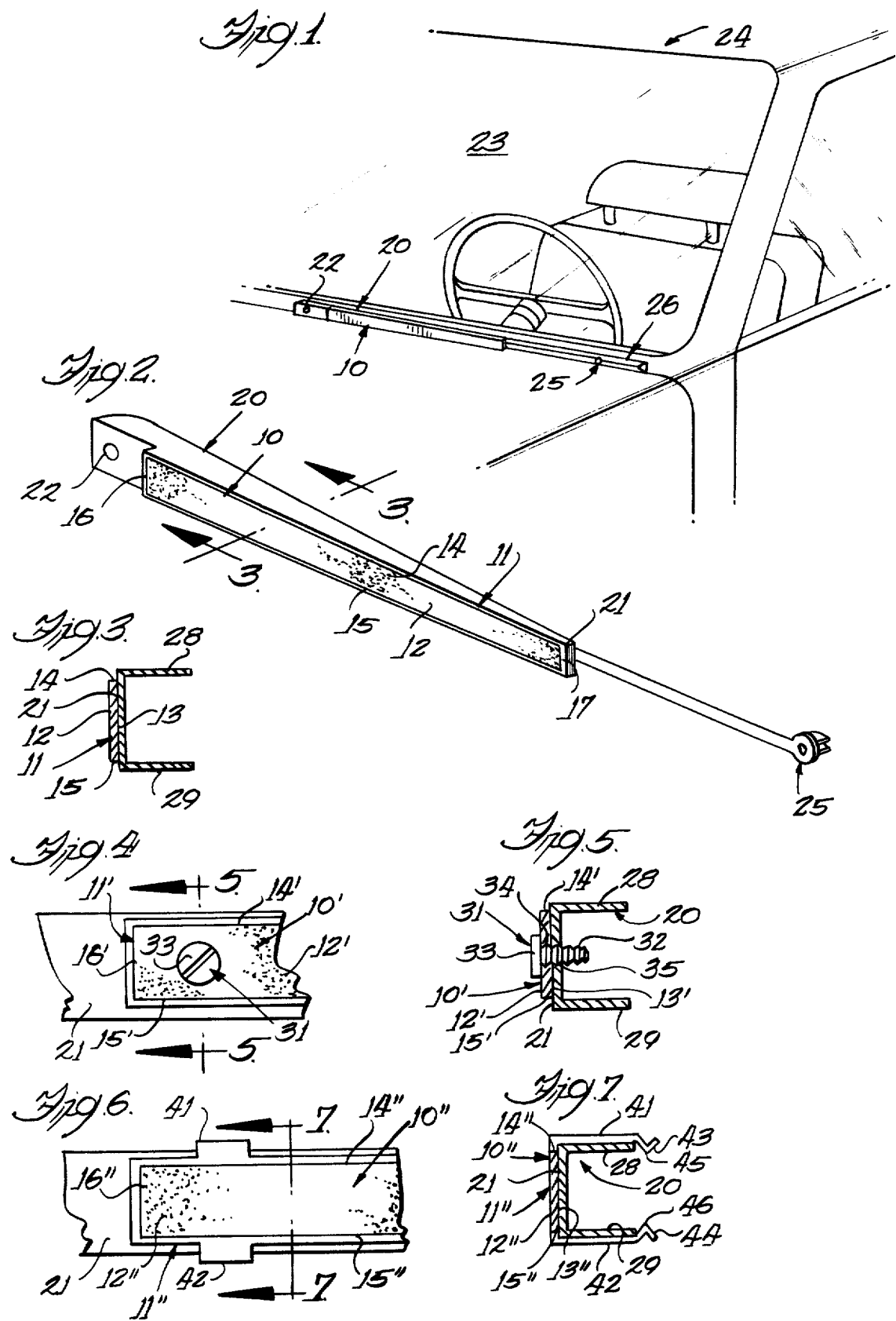

3,876,284

LIGHT REFLECTOR FOR WINDSHIELD WIPER ASSEMBLY

BACKGROUND OF THE INVENTION

1. Field of the Invention

This invention relates generally to vehicles and more particularly to a novel light reflecting warning device adapted to be attached to a windshield wiper arm providing increased visibility forwardly of the vehicle to oncoming traffic.

2. Description of the Prior Art

The value of reflective devices in protecting against hazards and preventing accidents and injuries is appreciated more and more as the importance thereof is constantly renewed to increase visibility of vehicles, both parked and moving, to other vehicles in a flow of traffic. Examples being cars, trucks and other vehicles which may be stopped or parked on roadways, streets and highways without lights with the reflectors serving to warn oncoming traffic at great distances of the presence of the stopped or parked vehicle.

In addition, such reflecting devices prove of assistance to moving vehicles having such reflecting devices thereon to assist in other traffic readily seeing such moving vehicle. However, such reflecting devices are normally mounted on either the side or back of the vehicle and thus do not provide visible warning of the vehicle forwardly thereof to oncoming traffic approaching the vehicle from the opposite direction of travel.

This has provided problem in the art in that to merely place conventional type warning reflecting devices on the forward portion of a vehicle would then confuse the driver of the oncoming traffic as to whether such vehicle is traveling in the same direction such that the driver is approaching the rear thereof, or whether the vehicle is traveling in the opposite direction so that the driver must be cautious thereof to avoid a head-on collision therewith. It would thus be desirable to provide a novel distinctive warning device visible to oncoming traffic and which is clearly recognized by such as immediately identifying an oncoming vehicle or the front end of a stopped or parked vehicle.

A further difficulty encountered in the art is the visibility between vehicles approaching each other in opposite directions in inclement weather, with it being desirable to provide a warning device which, while not distractive to oncoming traffic, would be distinctly noticable thereby in the inclement weather with drivers being able to make the necessary allowances to permit safe passage therebetween.

SUMMARY OF THE INVENTION

The present invention remedies and overcomes the foregoing deficiencies and disadvantages of presently available light reflecting warning devices by providing a novel warning device intended for mounting on the arm portions of a vehicle windshield wiper assembly in a manner visible forwardly of the vehicle thus increasing the visibility of the vehicle to oncoming traffic.

It is a feature of the present invention to provide a novel light reflecting warning device readily attached to a windshield wiper assembly in a non-obtrusive manner not affecting the operation of the wiper arm.

A further feature of the present invention provides a light reflecting warning device sized and configured to be mounted on the top surface of a windshield arm assembly visible forwardly of the vehicle in a manner to move in an arcuate path upon operation of the windshield wiper providing a highly visible moving warning device to oncoming traffic during inclement weather conditions requiring the utilization of the windshield wipers thus increasing the visibility of the vehicle to a driver of a vehicle approaching in the opposite direction.

Yet still a further feature of the present invention provides a lightweight readily attached and detached light reflecting device designed for mounting on a vehicle windshield wiper arm assembly for movement therewith in a manner providing a reflecting surface forwardly of the vehicle clearly visible to oncoming traffic approaching from the opposite direction of travel.

The provision of a light reflecting warning device for vehicles, such as briefly outlined above, and possessing the stated advantages, constitutes the principal features of the present invention. The provision of a light reflector for windshield wiper assemblies which is simple in its construction and which therefore may be readily manufactured at a low cost and by simple manufacturing methods; one which is rugged and durable and which will withstand the exposure to the weather elements; one which is aesthetically pleasing and refined in appearance; one which may, in its entirety, be manufactured and installed as part of the original equipment of the vehicle, or which may be attached to the vehicle later as an accessory item; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a fragmentary front perspective view of a portion of a vehicle windshield illustrating a windshield wiper assembly having a warning device constructed in accordance with the present invention attached thereto;

FIG. 2 is an enlarged perspective view of a wiper arm assembly having a warning device constructed in accordance with the present invention attached thereto;

FIG. 3 is an enlarged cross-sectional view taken along Line 3—3 of FIG. 2;

FIG. 4 is an enlarged fragmentary front elevational view of a modified form of the invention illustrating the warning device screwed to the windshield wiper arm;

FIG. 5 is a cross-sectional view taken along Line 5—5 of FIG. 4;

FIG. 6 is an enlarged fragmentary front elevational view of a further modified form of the invention illustrating the warning device clipped onto the windshield wiper arm; and FIG. 7 is a cross-sectional view taken along Line 7—7 of FIG. 6.

DESCRIPTION OF THE PREFERRED EMBODIMENTS

Referring now to the drawings in detail and in particular to FIGS. 1 to 3 inclusive, a preferred form of a warning device constructed in accordance with the principles of the present invention is designated in its entirety by reference numeral 10 and is comprised of an elongated sheet like rectangularly shaped member 11 having a light reflecting top surface 12, a bottom surface 13, opposed side edges 14 and 15, and opposed end edges 16 and 17. The back surface 13 is provided with a layer of self-sticking adhesive extending therealong which is adapted to secure the device 10 to the top surface 21 of a wiper arm assembly designated generally by reference numeral 20 which is adapted to be pivotally mounted by aperture 22 in a suitable manner with the customary location beneath a windshield 23 of a vehicle 24, the opposite end 25 of the wiper arm assembly adapted to be connected in the customary manner to a resilient rubber windshield clearing blade, such as designated by numeral 26. The wiper arm 20, in addition to top surface 21, is provided with depending side wall members 28 and 29 extending downwardly from the marginal longitudinally extending edges of the top surface 21.

In operation, warning device 10 is longitudinally aligned with the wiper arm 20 with back surface 13 placed in juxtaposition with front surface 21 and mounted thereto by means of the adhesive layer disposed on back surface 13. In this manner the light reflecting front surface 12 is visible forwardly of the vehicle to oncoming traffic approaching from the opposite direction. Further, in inclement weather requiring the utilization of the windshield wiper arm assembly 20 to sweep the blade 26 in an arcuate path across windshield 23 to maintain the same clear for visibility by the driver, such will automatically provide a sweeping reciprocal movement to the reflecting front surface increasing the visibility thereof to oncoming traffic in the inclement weather.

FIG. 4 is a modified form of the invention illustrating a light reflecting warning device 10' which is identical in shape and configuration to warning device 10 except for the elimination of the adhesive layer on the back surface 13 as the device 10' is mounted to the top surface 21 of the wiper arm 20 by utilization of a plurality of screws 31 each having a threaded shank 32 with an enlarged slotted head portion 33 adapted to extend through one of a plurality of longitudinally spaced apart openings 34 extending through the member 10' and which are aligned with openings 35 similarly spaced along the top surface 21 and extending therethrough, the back surface 13' placed in juxtaposition with the top surface 21 with the light reflecting surface 12' facing forwardly of the vehicle to be visible to oncoming traffic in the same manner as described with regard to the disclosure of FIGS. 1-3. In order to avoid needless repetition of description, similar reference numerals but having a single prime mark applied thereto have been utilized to identify corresponding parts as between the disclosure of FIGS. 1-3 and the disclosure of FIGS. 4 and 5.

Referring now to FIGS. 6 and 7 there is illustrated a further modified form of the invention designated generally by reference numeral 10" which is substantially identical to the disclosure of FIGS. 1-3 except for the elimination of a layer of adhesive on back surface 13 and with the device 10" being provided with a series of longitudinally spaced apart transversely aligned flanges 41 and 42 formed integrally with the device 10".

Again, in order to avoid needless repetition of description, similar reference numerals but having a double prime mark applied thereto have been utilized to designate corresponding parts as between the disclosures of FIGS. 1-3 and the disclosure of FIGS. 6 and 7. In this latter embodiment of the invention, each of the flange members 41 and 42 have their top edge portion connected to the marginal side edges 14" and 15" respectively of the member 11" and extend downwardly therefrom with each of the bottom ends 43 and 44 thereof including transversely extending inwardly directed projections 45 and 46 spaced a distance from member 11" sufficient to engage wiper arm 20 with top surface 21 in juxtaposition with member back surface 13' and with each of the flange members 41 and 42 having their respective interior surfaces disposed in juxtaposition with portions of the exterior surfaces of wiper arm side walls 28 and 29 with projections 45 and 46 projecting inwardly beneath the free bottom ends of each of the wiper arm side walls to frictionally retain the device 10" securely mounted to the wiper arm 20.

In operation, it is to be understood that flange members 41 and 42 are of a resilient material such that the device 10" is longitudinally aligned with the top surface 21 of the wiper arm 20 with end flange portions 43 and 44 engaging the top surface, after which a downward pressing force is applied to the device 10" in the direction of the wiper arm wedging apart ends 43 and 44 with projections 45 and 46 sliding transversely along respective wiper arm side walls 28 and 29 until reaching the bottom free end thereof at which time they project therebeneath to securely retain the device 10" therein.

The device 10, 10', and 10" may be manufactured out of any suitable satisfactory material such as metal, plastic, hard rubber, and the like which is both aesthetically pleasing and refined in appearance so as to enhance the appearance of the vehicle rather than detract therefrom.

It is to be understood that the light reflecting front surface 12 may be provided in any color desired, but a preferred color to clearly indicate to the driver of the oncoming vehicle that it is the front portion of a vehicle that he is viewing a preferred color would be amber which may be provided as integrally formed reflecting beads imbedded in the member 11, a reflecting tape applied to the front surface of the member 11, a florescent type reflective paint applied to the front surface of member 11, and the like with it being understood that the present invention provides that the device be suitable for use on all types and size of vehicles.

There is thus provided by the present invention a light reflecting device adapted for mounting on a wiper arm of a windshield wiper assembly of a vehicle which may be afixed thereto with only a minimum of time and effort, and at a low expense providing a highly visible marking and warning to drivers of oncoming traffic approaching the vehicle from the front thereof as to the position of the vehicle, the visibility of such parking being increased upon the utilization of the wiper arms in inclement weather to provide a sweeping waving type signal to oncoming traffic clearly indicating the presence of the vehicle.

It is to be understood that the form of this invention herewith shown and described is to be taken as preferred examples of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A warning reflector attachment intended for a vehicle windshield wiper assembly comprising:

a rectangularly elongated flat member having a front surface, a back surface, side edges, and opposed end edges, the member being of a size and configuration adapted to be mounted to an arm of the vehicle windshield wiper assembly with the back surface of the member in juxtaposition with the wiper arm top surface of the front surface of the member projecting forwardly of the wiper arm top surface in a manner to be visible forwardly of the vehicle;

a pair of transversely aligned flange elements associated with each end edge of the member and spaced slightly inwardly therefrom, each of these flange elements of each pair of flange elements being transversely aligned and identical with each other with each extending downwardly from the associated side edge of the member, each of the pair of flange elements defining with the back surface of the member a generally U-shaped cross-section;

an inwardly projecting bead of a triangular cross-Sectional configuration extending longitudinally completely along the bottom free edge of each of the flange elements and having their apex portion disposed and confronting relationship and projecting into the U-shaped cross-section, the beads defining wedge-like members adapted to engage the sidewalls of the wiper arm upon the reflector attachment being placed thereover with pressure thereon to engage the attachment to the wiper arms effecting the resilient spreading of the flange elements apart by action of the wedge-like beads after which the bead projections slide along the wiper arm sidewalls until the marginal inner edge of such wiper arm sidewalls are reached at which time the resilient nature of the flange elements effect the engagement of the projecting beads behind the edges of the wiper arm sidewalls to securely retain the member in position thereon requiring no alteration or modification of the wiper arm; and a flat rectangularly elongated light reflecting amber colored tape material adhesively secured to the front surface of the member and extending therealong within the boundaries of the side edges and end edges to be visible forwardly of the vehicle.

* * * * *